(12) United States Patent
Marei et al.

(10) Patent No.: US 10,058,818 B2
(45) Date of Patent: Aug. 28, 2018

(54) PRE-TREATMENT OF SAMPLES BY ELECTROCHEMICAL REMOVAL OF DISSOLVED GASES

(71) Applicant: University of Louisville Research Foundation, Inc., Louisville, KY (US)

(72) Inventors: Mohamed M. Marei, Louisville, KY (US); Richard P. Baldwin, Louisville, KY (US); Thomas J. Roussel, Jr., Louisville, KY (US); Robert S. Keynton, Louisville, KY (US)

(73) Assignee: UNIVERSITY OF LOUISVILLE RESEARCH FOUNDATION, INC., Louisville, KY (US)

( * ) Notice: Subject to any disclaimer, the term of this patent is extended or adjusted under 35 U.S.C. 154(b) by 0 days.

(21) Appl. No.: 14/722,791

(22) Filed: May 27, 2015

(65) Prior Publication Data
US 2015/0343372 A1  Dec. 3, 2015

Related U.S. Application Data

(60) Provisional application No. 62/003,267, filed on May 27, 2014.

(51) Int. Cl.
*B01D 53/32* (2006.01)
*B01D 53/22* (2006.01)

(52) U.S. Cl.
CPC ......... *B01D 53/326* (2013.01); *B01D 53/229* (2013.01); *B01D 2257/104* (2013.01)

(58) Field of Classification Search
CPC ........ B01D 2259/45; B01D 2259/4516; B01D 2311/08; B01D 53/30; B01D 53/326; B01D 57/02
See application file for complete search history.

(56) References Cited

U.S. PATENT DOCUMENTS

| | | | |
|---|---|---|---|
| 7,632,338 B2 | 12/2009 | Cipollini | |
| 2004/0000483 A1* | 1/2004 | Jackson | G01N 27/4473 204/601 |
| 2007/0163438 A1* | 7/2007 | Chiappetta | B01D 19/0042 96/6 |
| 2008/0083608 A1* | 4/2008 | Cipollini | B01D 19/0084 204/157.5 |
| 2009/0227034 A1* | 9/2009 | Limaye | B01D 53/30 436/50 |

OTHER PUBLICATIONS

E. Beinrohr, M. Cakrt, J. Dzurov, L. Jurica, J. A. C. Broekaert. "Simultaneous calibrationless determination of zinc, cadmium, lead, and copper by flow-through stripping chronopotentiometry". Electroanalysis. 1999, 11, 1137-1144.

(Continued)

*Primary Examiner* — Steven A. Friday
(74) *Attorney, Agent, or Firm* — Wyatt, Tarrant & Combs, LLP; Stephen C. Hall (57) ABSTRACT

Present embodiments provide an energy-efficient separator having at least two chambers fluidically isolated by a gas permeable membrane for the removal of dissolved gases from a sample which, in some aspects, enables cost-effective monitoring of liquid samples to be performed remotely and automatically, and in other aspects is suited for various other applications where removal and/or regulation of gases in a sample are desirable.

11 Claims, 7 Drawing Sheets

(56) References Cited

OTHER PUBLICATIONS

M.L. Tercier-Waeber, J. Buffle. "Submersible online oxygen removal system coupled to an in situ voltammetric probe for trace element monitoring in freshwater". Environ. Sci. Technol. 2000, 34, 4018-4024.

M. Skolimowski, M.W. Nielsen, J. Emneus, S. Molin, R. Taboryski, C. Sternberg, M.Dufva, O. Geschke. "Microfluidic dissolved oxygen gradient generator biochip as a useful tool in bacterial biofilm studies". Lab Chip. 2010, 10, 2162-2169.

P.C. Thomas, S.R. Raghavan, S.P. Forry. "Regulating oxygen levels in a microfluidic device". Anal. Chem. 2011, 83, 8821-8824. Ref #14 of line item 1.

N. Plumere, J. Henig, W.H. Campbell. "Enzyme-catalyzed O2 removal system for electrochemical analysis under ambient air: application in an amperometric nitrate biosensor". Anal. Chem. 2012, 84, 2141-2146.

J.J. Pedrotti, L. Angnes, I.G.R Gutz. "A fast, highly efficient, continuous degassing device and its application to oxygen removal in flow-injection analysis with amperometric detection". Anal. Chim. Acta 1994, 298, 393-399.

C. Colombo, C.M.G. van den Berg. "In-line deoxygenation for flow analysis with voltammetric detection". Anal. Chim. Acta 1998, 377, 229-240.

C. Billing, D.R. Groot, J.F. van Staden. "Determination of arsenic in gold samples using matrix exchange differential pulse stripping voltammetry". Anal. Chim. Acta 2002, 453, 201-208.

\* cited by examiner

PRE-TREATMENT OF SAMPLES BY ELECTROCHEMICAL REMOVAL OF DISSOLVED GASES

CROSS REFERENCE TO RELATED U.S. APPLICATION

This application claims the benefit of priority to U.S. Provisional Application No. 62/003,267, which was filed on May 27, 2014, the contents of which are incorporated herein by reference.

FIELD OF INVENTION

Embodiments described herein relate to pre-treatment of liquid or gas samples to remove dissolved gases therefrom, and are useful for various applications including when performed prior to analyzing samples for the presence of metals or other analytes.

BACKGROUND

In various settings, the presence of dissolved gases in samples presents challenges in a number of ways. A few examples include microfluidic applications, lab-on-a-chip (LOC) applications, microfluidic oxygen removal/control in capillary electrophoresis, microfluidic cell culturing platforms, oxygen-sensitive reactors, and analyzing liquid samples for the presence of metals or other contaminants.

With respect to testing for metals, one technique for analyzing a sample is Anodic Stripping Coulometry (ASC). ASC involves configuring an electrolytic cell comprising an anode and cathode; applying potential to the electrodes sufficient to cause an analyte(s) of interest—such as copper, mercury, lead, and cadmium to name a few—to deposit upon one of the electrodes; applying potential sufficient to completely "strip" the analyte(s) from the electrode where they deposited; and characterizing or measuring the analytes in association with the current for stripping. However, any dissolved gases in the sample can cause interference because the gases may also be reduced at potentials needed for electrodeposition of the analytes, skewing the results or limiting the electrode life.

ASC and other electrochemical-based analysis systems, including the electrodes and cells which comprise them, are generally scalable to the microscale without significantly compromising their performance. Taking advantage of this feature, microfabricated electrochemical devices commonly serve as sensors for identifying and quantifying the presence of analytes in a liquid sample, and have been employed remotely for such purposes. Such devices are cost-effective to mass produce, they can be set up to perform remotely, and they are configurable to detect a wide variety of analytes.

Even so, to take full advantage of the opportunity, challenges must be overcome. One of these is the need to remove dissolved gases from samples before analysis occurs (i.e., pretreatment). Oxygen is one such gas, but not the only gas. Oxygen is reduced on silver electrodes in highly basic solution by the following reaction sequence: (1) $O_2+H_2O+2e^- \rightarrow HO_2^-+OH^-$; (2) $HO_2^- \rightarrow \frac{1}{2}O_2+OH^-$. P. K. Adanuvor, et al., J Electrochem Soc. 135 (1998) 2509-2517.

However, while the electrochemical removal of dissolved oxygen from a sample has been performed, prior approaches also carry downsides. Some rely on the application of a vacuum, which requires a significant amount of power. Others expose the sample to an oxygen scavenger which can alter its metal speciation. Some have used purging with an inert gas such as argon or nitrogen, which is cumbersome, and may change the pH of the sample. These prior approaches require time-consuming, on-site labor to carry out, making automated remote analysis challenging, if not infeasible. Further, none of these approaches is readily adaptable for use in microfluidic or LOC platforms.

Accordingly, there remains a need for systems, methods and apparatus for removing dissolved gases from a sample, which overcome the limitations of known systems, including the need for direct operator intervention and to avoid having the removal process chemically or physically alter the sample. The removal of dissolved gases from a sample is useful in a range of activities, from sample testing to removal of flow-impeding gas bubbles in LOC applications and other settings where the removal or regulation of dissolved gases is desirable.

SUMMARY OF EMBODIMENTS

Current embodiments and alternatives utilize a two-chamber separator with a membrane between the chambers. This separator device allows dissolved gas to passively diffuse or otherwise moves across the membrane from a sample chamber into a gas receiving chamber, without physically or chemically altering the sample. This electrochemical removal of dissolved gases increases working life of sensors, makes analysis of metals and other analytes in a liquid sample more efficient and less labor-intensive, and increases the efficiency of other processes that require removal or regulation of dissolved gases. Herein, the phrases "dissolved gas" or "dissolved gases" and the words "gas" or "gases" are used synonymously.

Current embodiments are suitable for a range of applications, including as microfabricated, continuous flow, low-power electrochemical platforms for on-site removal of dissolved oxygen for use with ASC or other testing devices for metal analysis. Embodiments are useful in testing for chemical contaminants in various kinds of samples, including drinking water, ground water, and water treatment effluent. Although an embodiment for testing metals is described, the embodiments herein are not limited to a single embodiment or type of use, but are useful in a range of other settings that include microfluidic applications, LOC applications, microfluidic oxygen removal/control in capillary electrophoresis, microfluidic cell culturing platforms, and oxygen-sensitive reactors, to name a few.

An example system providing an electrochemical dissolved gas removal device (i.e., a separator) is described herein. Such a separator contains a sample chamber through which a stream of liquid sample flows. The sample chamber and a gas receiving chamber are arranged with a gas-permeable membrane separating the two chambers. Present embodiments include, but are not limited to, those wherein the gas receiving chamber comprises a plurality of sub-chambers. The dissolved gas is removed from the sample flowing through a channel of the sample chamber, as it diffuses through the permeable membrane to enter the gas receiving chamber, where it is reduced by a silver electrode. The separator described here is exemplary, to help illustrate that the current embodiments are intended to be practiced in any number of forms. It is expected that embodiments within the scope of the current disclosure will employ various known materials and electrodes, will be practiced upon various kinds of samples and applications, and will be used for separating oxygen and other gases from a sample. In some embodiments, post-separation, the sample stream is transferred to a sensor to confirm the gas has been removed from the sample stream. The suitable uses for present embodiments also include pre-treatment of liquid samples prior to electrochemical or other analysis, as well as microfluidic applications, LOC applications, microfluidic oxygen removal/control in capillary electrophoresis, microfluidic cell culturing platforms, and oxygen-sensitive microfluidic reactors.

BRIEF DESCRIPTION OF THE DRAWINGS

The drawings and descriptions herein are to be understood as illustrative of steps, structures, materials, features and aspects of the present embodiments and do not limit the scope of the embodiments. The scope of the application is not limited to the precise arrangements or scales as shown in the drawings.

MULTIPLE EMBODIMENTS AND ALTERNATIVES

Figure 1A:
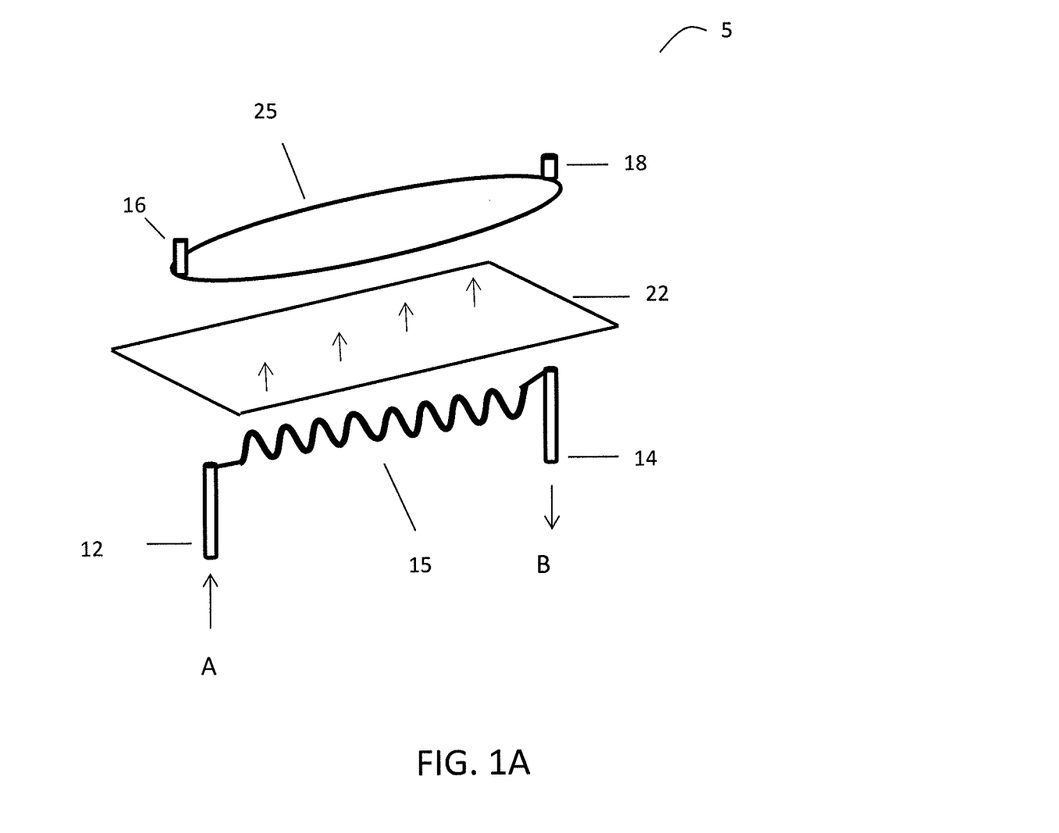
FIG. 1A is a schematic of a system for electrolytic removal of dissolved gas from a sample, according to multiple embodiments and alternatives.
Figure 1B:
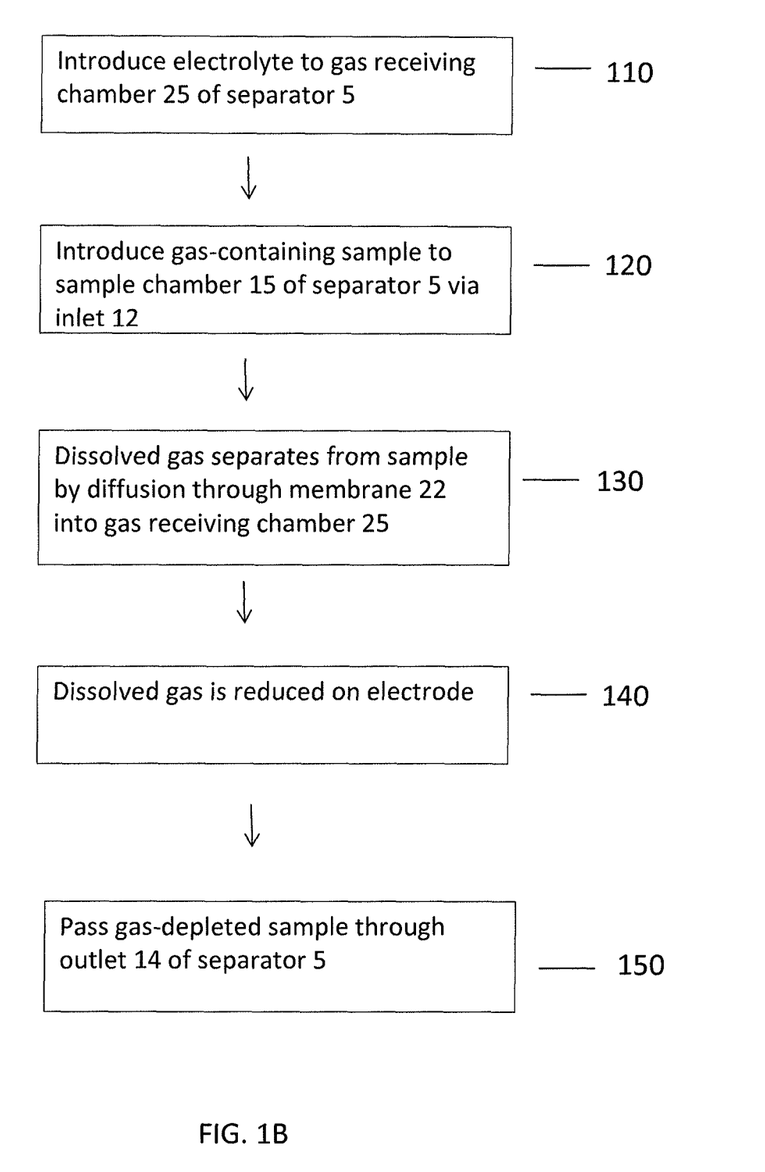
FIG. 1B is a flowchart depicting the steps associated with a system and method for electrolytic removal of dissolved gas from a sample, according to multiple embodiments and alternatives.

According to multiple embodiments and alternatives provided herein, a system for electrolytic removal of gas from a sample comprises a separator, which contains at least two chambers, and a gas-permeable membrane positioned between them. One chamber is a sample chamber, and the other is a gas receiving chamber. FIG. 1A schematically depicts a separator 5, and FIG. 1B provides a listing of steps associated with use of such a separator. The two chambers, 15 and 25, are arranged with membrane 22 between them as shown in FIG. 1A. Electrolyte is introduced to the gas receiving chamber 25 (step 110). At step 120 in FIG. 1B, a sample with dissolved gas is introduced (e.g., by HPLC pump) through inlet 12 as indicated by directional A in FIG. 1A, to enter sample chamber 15. In some embodiments, the sample chamber is in the form of a serpentine channel to increase surface area of separator chamber's 15 interface with membrane 22, to increase exposure time between the sample and the membrane, and to promote diffusion of gases across the membrane.

As gas is removed from the sample by diffusing through membrane 22 at step 130, the dissolved gas is depleted, i.e., it is chemically transformed as it undergoes reduction at the cathode positioned in the gas receiving chamber at step 140, or alternatively oxidation depending on the set up and the nature of the gas being removed. Diffusion of gas from chamber 15 through membrane 22 to chamber 25 is indicated by the unlabeled arrows depicted on the membrane as shown in FIG. 1A. Gas receiving chamber 25 further comprises electrodes that perform the electrolysis of the dissolved gas (see FIG. 2 and FIG. 3). At step 150, the sample (following gas removal) then exits separator 5 via outlet 14 as indicated by directional arrow B in FIG. 1A. Ports 16 and 18 are also shown in FIG. 1A, which facilitate the introduction of electrolyte into the gas receiving chamber (e.g., by syringe via port 16).

Figure 2:
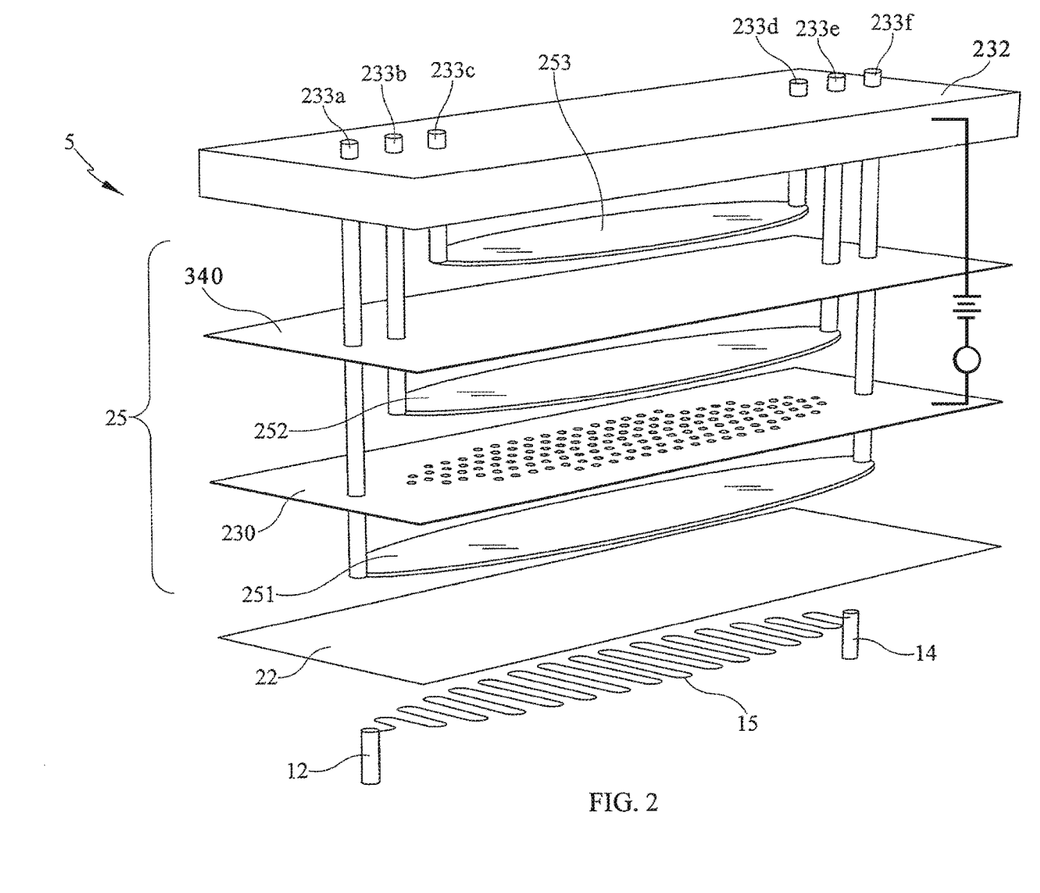
FIG. 2 is an exploded view of a separator device for electrolytic removal of dissolved gas from a sample, according to multiple embodiments and alternatives.

FIG. 2, with some structural layers of the separator omitted for clarity, shows separator 5 which comprises a sample chamber 15 and a gas receiving chamber 25, wherein the two chambers are separated by permeable membrane 22. Optionally, sample chamber 15 is in the form of a channel, and the sample stream flows through the channel in fluid proximity with membrane 22. In some embodiments, the length of the channel is such that sample residence time is at least 10 times the diffusion time ($2\sqrt{Dt}$) at a flowrate of about 10 µL/min. Embodiments include those wherein various kinds of flow (e.g., laminar flow or turbulent flow) between inlet 12 and outlet 14 are employed to allow gas to diffuse across membrane 22.

Generally, upon entering sample chamber 15, non-gaseous matter of the sample stream will flow out of separator 5 via outlet 14. Certain gaseous matter, however, will diffuse through membrane 22 from sample chamber 15 to the gas receiving chamber 25. Thus, membrane 22 is selected and arranged in the separator to allow at least one gas to diffuse from chamber 15 to chamber 25, while preventing substantially all the non-gaseous matter from entering the gas receiving chamber. Optionally, that which flows out of separator 5 via outlet 14 can be analyzed, e.g., through electrolysis or other analytical techniques as chosen. What passes through membrane 22 into gas receiving chamber 25 is reduced at the negative electrode positioned in chamber 25, or the system can be configured for oxidation at the positive electrode depending on the nature of the separation. Optionally, post-separation, the sample exiting the separator 5 is transported to a detector 435, as discussed with FIG. 4, where the separation of the gas from the sample stream is confirmed, before the sample is analyzed for metals or other analytes.

Silicone rubber is a suitable material for membrane 22 because it is permeable to a range of gases, including oxygen and ammonia to name a few. Accordingly, a permeable membrane 22 is positioned or integrally fitted over sample chamber 15 to allow the diffusion of gas molecules across the membrane, and to substantially impede non-gaseous matter in the sample from entering the gas receiving chamber. In some embodiments, membrane 22 has a thickness of approximately 125 µm. The permeability coefficient is the rate of gas permeation as a function of area, force, and membrane thickness, and thus is proportional to the rate of gas transfer across a membrane. For removal of oxygen across a silicone membrane, a suitable oxygen permeability coefficient is about 19685 $cm^3 \cdot mm/m^2 \cdot day \cdot atm$ for un-wetted silicone rubber, according to *Permeability Properties of*

*Plastics and Elastomers—A Guide to Packaging and Barrier Materials*, 2nd ed.; Massey, L. K., Ed.; Plastics Design Library Series; William Andrew Publishing: Norwich, N.Y. (2003), or alternatively a permeability coefficient for oxygen through silicone is about 39398 $cm^3 \cdot mm/m^2 \cdot day \cdot atm$ according to W. L. Robb, Annals of the New York Academy of Sciences 146 (1968) Materials in Biochemical Engineering, 119-137. Table 1 provides a listing of permeability coefficients across silicone membranes from Robb's 1968 published work for various gases which can be removed from sample streams, according to the present embodiments.

TABLE 1

| GAS NAME | FORMULA | Permeability coefficient ($cm3 \cdot mm/m2 \cdot day \cdot atm$) |
|---|---|---|
| Nitrogen | $N_2$ | 18386 |
| Carbon monoxide | CO | 22326 |
| Oxygen | $O_2$ | 39398 |
| Nitric oxide | NO | 39398 |
| Argon | Ar | 39398 |
| Hydrogen | $H_2$ | 42682 |
| Helium | He | 22982 |
| Methane | $CH_4$ | 62381 |
| Ethylene | $C_2H_4$ | 88646 |
| Ethane | $C_2H_6$ | 164160 |
| Carbon dioxide | $CO_2$ | 213408 |
| Propane | $C_3H_8$ | 269222 |
| Nitrous oxide | $N_2O$ | 285638 |
| Acetone | $C_3H_6O$ | 384791 |
| Ammonia | $NH_3$ | 387418 |
| Nitrogen dioxide | $NO_2$ | 492480 |
| Octane | $n-C_8H_{18}$ | 564710 |
| Butane | $n-C_4H_{10}$ | 590976 |
| Toluene | $C_7H_8$ | 599512 |
| Hexane | $n-C_6H_{14}$ | 617242 |
| Hydrogen sulfide | $H_2S$ | 656640 |
| Benzene | $C_6H_6$ | 709171 |
| Methanol | $CH_3OH$ | 912730 |
| Sulfur dioxide | $SO_2$ | 984960 |
| Pentane | $n-C_5H_{12}$ | 1313280 |
| Water | $H_2O$ | 2363904 |
| Carbon disulfide | $CS_2$ | 5909760 |

According to present embodiments, the range of materials suitable for membrane 22 is broad. Generally, membrane selection is determined from various factors that include the nature of the gas that is removed and the types of electrodes employed in the gas receiving chamber. Suitable membranes are formed or selected from microporous or macroporous hydrophobic membranes. Examples of these include flat sheet membranes such as Sartorius® PTFE membranes, hollow fiber membranes such as Celgard Liquicel®, microporous hydrophobic flat sheet PTFE membranes such as those offered by Advantec MFS Inc., and Poreflon® PTFE membranes. Such hydrophobic membranes prevent direct contact between two aqueous solutions due to gas bubbles trapped within the pores as previously described. As an example, for ammonia gas ($NH_3$) dissolved in liquid samples, the net transport of ammonia from the sample stream into the gas receiving chamber relies on an equilibrium between dissolved ammonium ions ($NH_4^+$) and dissolved ammonia gas ($NH_3$). The equilibrium between $NH_4^+$ and $NH_3$ may be unaltered in the sample stream such that as $NH_3$ is depleted through electrolysis in the gas receiving chamber, the balance of equilibrium causes $NH_4^+$ ion to convert to $NH_3$, the depletion of which and resulting equilibrium shift induces additional amounts of $NH_3$ to be removed from the sample stream. It will be appreciated that the equilibrium in a liquid sample stream may be artificially adjusted (e.g., by increasing sample pH) so that $NH_3$ is the predominant form, in which case it will cause $NH_3$ to cross the membrane more readily to be removed from the sample stream. While various portions of the discussion herein have involved a liquid sample, alternatively the sample stream itself may be comprised of a mixed gas where gases to be removed are in their gaseous forms (e.g., $O_2$ or $NH_3$).

In operation, separator 5 is associated with three concentration gradients that facilitate the diffusion of gas molecules across membrane 22 as gas enters chamber 25. First, there is substantially no gas within chamber 25 initially, prior to any sample stream flowing through the sample chamber's channel. Second is the concentration gradient as a function of the permeability coefficient of membrane 22, and third is a gas concentration gradient existing in the sample contained in sample chamber 15.

In some embodiments, a cathode 230 and anode 232 are positioned in gas receiving chamber 25. A silver cathode, which can be in the form of a perforated sheet as shown in FIG. 2, is suitable for electrode 230, and graphite is a suitable anode for electrode 232. In an embodiment, cathode 230 is composed of high-grade silver foil with dimensions of 150 mm×25 mm×75 µm. Other known materials can be substituted for electrodes 230, 232, respectively.

Referring still to FIG. 2, in an embodiment gas receiving chamber 25 comprises three sub-chambers 251, 252, and 253, which are configured to receive an electrolyte, such as NaOH. Commonly, the electrolyte is a liquid, but the electrolyte can take other forms (e.g., a gel). Optionally, separator 5 further includes ports 233 *a-f* which are positioned in through-holes of sub-chambers 251-253 and a top fixture (shown in FIG. 3), and which allow the electrolyte to be introduced into and to move within chamber 25. The ports may be equipped with suitable adapter fittings and valves (not shown) for adding electrolyte to chamber 25, and to control movement of electrolyte between the sub-chambers. After addition of electrolyte, closing the valves minimizes the flow of electrolyte, thus promoting the depletion of gases that diffuse into gas receiving chamber 25.

Figure 3:
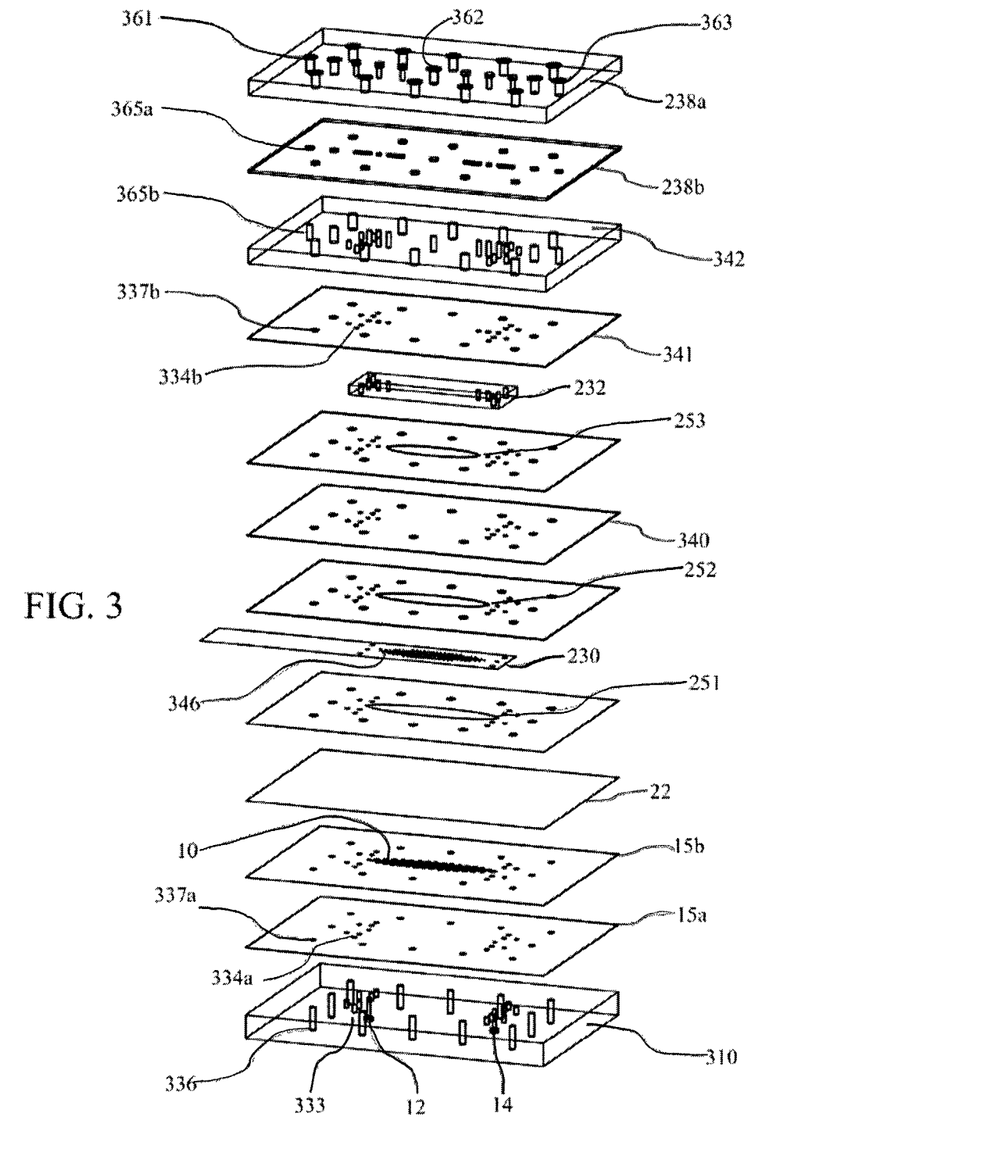
FIG. 3 is a layer-by-layer exploded view of a separator device for electrolytic removal of dissolved gas from a sample, according to multiple embodiments and alternatives.

As FIG. 3 illustrates, embodiments include those which are fabricated using a 'layer-by-layer' approach with PVC fixtures at the top (proximal to gas receiving chamber 25) and at the base (proximal to sample chamber which in the figure includes layers 15a and 15b). Suitable, non-limiting dimensions for the sample chamber are about 300 µm×400 µm (width) and 345 mm (length), with a channel depth of about 250 µm. In some embodiments, a channel 10 is formed integral with chamber 15 through conventional techniques, such as by cutting into the rubber with a commercial laser cutter/engraver. Preferably, sample chamber 15 is fitted over base PVC fixture 310 as shown in FIG. 3. In some embodiments, this fixture is fabricated with a plurality of openings for alignment pins 333. FIG. 3 illustrates twelve openings in layer 15a for alignment pins 333, with one labeled 334a (so as not to diminish the clarity of the figure with an overabundance of numerals). The number of alignment pins is not limiting. A number of openings 334 are formed in several layers for accommodating the alignment pins (another of such openings being labeled 334b for layer 341). The alignment pins 333 terminate at one end into openings on the bottom face of PVC fixture 342 which are matable with the alignment pins in a one-to-one relationship for stabilizing the separator device and for alignment of layers. Openings 334a and 334b for alignment pins are illustrated, with similar openings formed in layers therebetween, with the exception of the electrodes. Membrane 22 may also be formed with corresponding openings (not shown) for alignment pins 333 and bolts 336. The specific number of openings is non-limiting.

As shown in FIG. 3, base fixture 310 may include a series of threaded bodies 336, each having a corresponding hole 337 accommodating a bolt (not shown) configured to mate with one of the threaded bodies to retain the layers intact once the bolts are tightened. FIG. 3 illustrates twelve such threaded bodies 336, with one being labeled (so as not to diminish clarity with an overabundance of numerals). The number of threaded bodies 336 and holes 337 is not limiting. Holes 337a and 337b are labeled in the figure for layers 341 and 15a, respectively, with similar holes formed in layers therebetween, with the exception of the electrodes. Again, membrane 22 may also be formed with corresponding openings (not shown). The sample chamber 15 is shown here with separate layers 15a and 15b, the former being suitably formed as a rubber bottom layer for channel 10 (e.g., a fluoroelastomer such as Viton® available from Dupont™). In this embodiment, layer 15b is formed from similar materials and provides the sides for channel 10, and the top of the channel is membrane 22. With respect to the sample chamber, FIG. 3 shows inlet 12 for receiving a sample stream that communicates with channel 10. In operation, a sample stream would pass through channel 10 and exit the separator device shown in this figure via its outlet 14.

Continuing with FIG. 3, sub-chambers 251, 252, and 253 are shown as elliptical recesses in their respective rubber layers, collectively forming gas receiving chamber 25 which also includes electrodes 230, 232. Using a precision laser patterned polycarbonate stencil and needle, small perforations (e.g., 0.1 mm to 0.5 mm) can be made in the foil of electrode 230, thus forming a perforated region 346 to facilitate electronic contact between the graphite electrode 232 and the electrolyte solution in the chamber. As desired, a membrane 340 (e.g., SelRO™ MPF-34 from Koch Membrane Systems, Inc.) which can be porous is positioned between the electrodes to prevent short-circuiting, and additional rubber 341 is positioned between electrode 232 and fixture 342, to facilitate a fluidic seal within the gas receiving chamber. Similarly, the layers containing sub-chambers 251, 252, and 253 are formed from rubber to ensure fluidic seals to the layers above and below, and may like other layers of the structure contain additional openings to allow fluid movement of electrolyte within chamber 25. Some suitable sealing materials may include various known thermoplastic materials like Kapton®, fluoroelastomers such as Viton®, and silicone. A top fixture of separator 5 is shown in FIG. 3.

Referring now to FIG. 3, in some embodiments, top fixture comprises dual layers of PVC 238a and rubber 238b, though other materials of suitable hardness and durability can be used. Top securing bolts 361, 362, and 363 project from top layer 238a which serves as a top-most fixture. Corresponding openings (one being labeled 365a) in layer 238a and in layer 238b accommodate the top securing bolts for holding the top of the structure with fixture 342. The top securing bolts are matable with a like number of threaded bodies 365 (one being labeled 365b) formed in fixture 342. The un-numbered bolts shown in the top-most layer 238a may run the full length of the assembly to base 310 to mate with threaded bodies (one being labeled 336). Alignment pins may be used to assist in positioning of any layers such as by way of opening 333 in base fixture 310, which houses a stainless steel pin that continues vertically through opening 334b in 341, terminating in a precision patterned hole formed in a bottom face of fixture 342.

Figure 4:
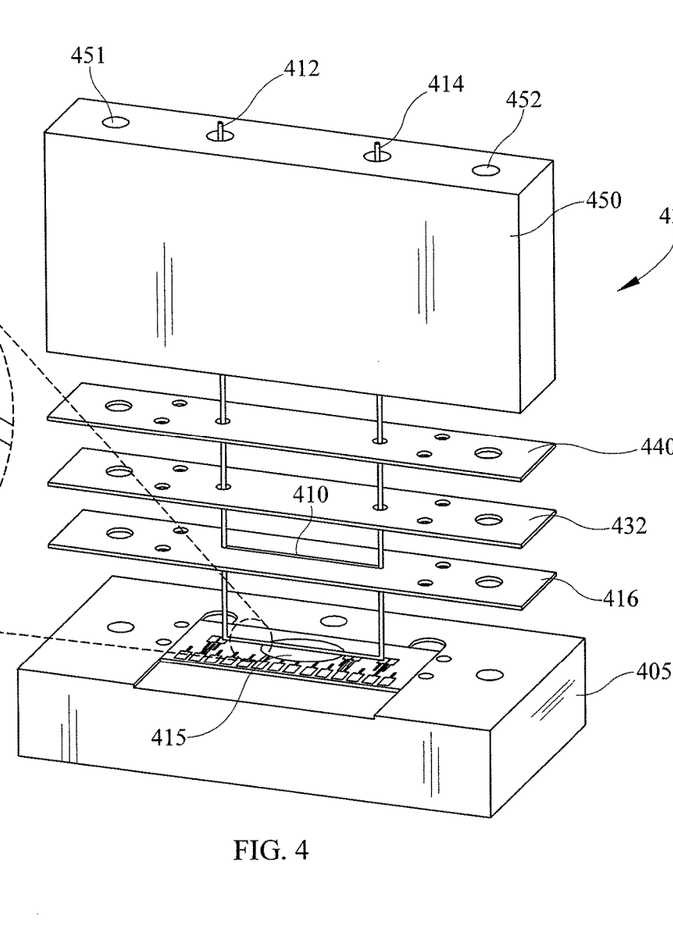
FIG. 4 illustrates a thin-layer cell dissolved gas detector as part of a system for electrolytic removal of gas from a sample, according to multiple embodiments and alternatives.

After gas is removed from a sample, and the sample stream exits separator 5 via outlet 14 (FIG. 1), some embodiments include a detector 435 as illustrated in FIG. 4, which is used to confirm removal of dissolved gases from a sample. In an embodiment, detector 435 comprises a three electrode single compartment flow cell having a polycarbonate bottom fixture 405 with a recessed groove accommodating a sensor chip, Viton® rubber sealing layers 416, 440 surrounding a graphite counter electrode 432, and a PVC top fixture 450 with a detector inlet 412 and a detector outlet 414. In an embodiment, counter electrode 432 is a 100 µm flat pyrolytic graphite sheet incorporated as an additional layer atop the channel. Various layers may include through-holes to tighten the assembly and facilitate alignment (e.g., 451, 452 are labeled in fixture 450, with through-holes continuing down through all layers), and additional openings accommodating flow paths between detector inlet 412 and detector outlet 414. In some embodiments, through-holes are about 1-2 mm in diameter. The fabrication process of the individual layers is similar to that described above for separator 5. Preferably, detector 435 further comprises a detector chamber 415 for electrolyte and a channel 410 cut into rubber sealing layer 416 and in fluid communication with detector chamber 415. In an embodiment, channel 410 has dimensions of about 250 µm deep, 500 µm wide and 2 cm long. Further structural and fabrication detail regarding detector 435 is found in "Electrochemical Dissolved Oxygen Removal from Microfluidic Streams for LOC Sample Pretreatment," M. M. Marei, et al., Anal. Chem. 86 (2014) 8541-8546, which is incorporated by reference as if fully set forth herein.

Figure 4A:
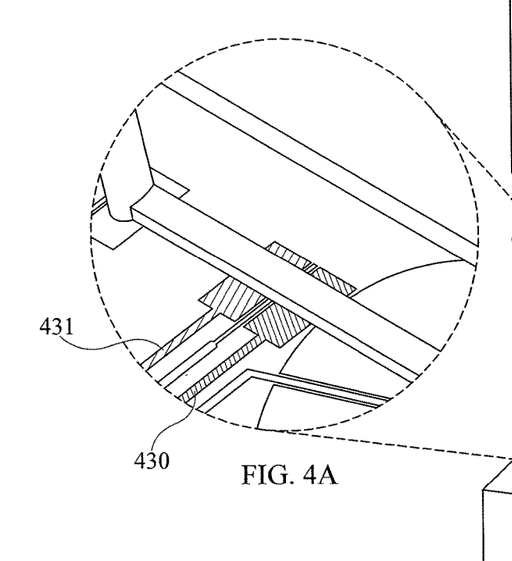
FIG. 4A is an inset that illustrates additional detail within the region designated by a dashed line circle of a detector according to FIG. 4.

The inset shown in FIG. 4A illustrates a region of detector 435 containing the working electrode 430 and reference electrode 431 positioned at the bottom of channel 410 seen in FIG. 4. Electrodes 430, 431 are patterned lithographically from thin film gold electrodes. The deposition of a silver layer followed by electrochemical oxidation in chloride ion-containing medium converts electrode 431 to a silver/silver chloride pseudo reference electrode. In an embodiment, electrodes 430, 431 have an exposed length of 1 mm, and are approximately 200 µm apart. As an alternative to detector 435, or in conjunction with detector 435, at the separator the current consumed by the cathode in the gas receiving chamber 25 (or the anode, depending on whether gas is depleted by reduction or oxidation) is monitored to confirm activity of the subject electrode and depletion of gas entering that chamber.

Experimentally, a reproducible oxygen reduction system was used as a reference comparison to separator 5. Such a reference system has been described and was reported to remove substantially all dissolved oxygen from a sample. This reference system was based on the diffusion of dissolved oxygen from a sample stream flowing into a counter-flowing nitrogen stream within a silicone rubber jacket. "A fast, highly efficient, continuous degassing device and its application to oxygen removal in flow-injection analysis with amperometric detection." J. J. Pedrotti, et al., Anal Chimica Acta. 298 (1994) 393-399.

Accordingly, a test sample stream of air equilibrated 100 mM KCl was pumped through channel 10 of separator 5 at a flow rate of 10 µL/min controlled by a conventional HPLC pump. The dissolved oxygen in the test stream was confirmed at 8 ppm by measurement using a commercially available oxygen probe. Electrical contact with the silver cathode was established with alligator clips (not shown). Electrical contact with the graphite anode was established by affixing a length of copper foil to one corner between layers 232 and 341, which became firmly held in place when bolts were inserted in the through-holes, threaded, and tightened, as previously discussed.

After adding electrolyte (i.e., 6.5M NaOH in deionized water) to gas receiving chamber 25, the separator was activated by applying a 1V potential between the electrodes to initiate electrolysis of dissolved oxygen that had diffused from the sample chamber to the gas receiving chamber. Similarly, air equilibrated 100 mM KCl was pumped through Pedrotti's reference system with the introduction of nitrogen into the rubber jacket at a level sufficient for oxygen removal, and the sample was then transferred through tubing to detector 435, and oxygen content of the reference stream was analyzed.

An electrolyte consisting of ACS reagent grade KCl was used with detector 435. Oxygen removal was monitored with a potentiostat by cyclic voltammometry (CV) and amperometry. The CV proceeded between 0 mV to −800 mV at a scan rate of 1000 mV/s, and the amperometry began at 0 mV with a single step to −800 mV, both having the working electrode 430 held at a preconditioning potential of OmV prior to the scan or step up.

Figure 5:
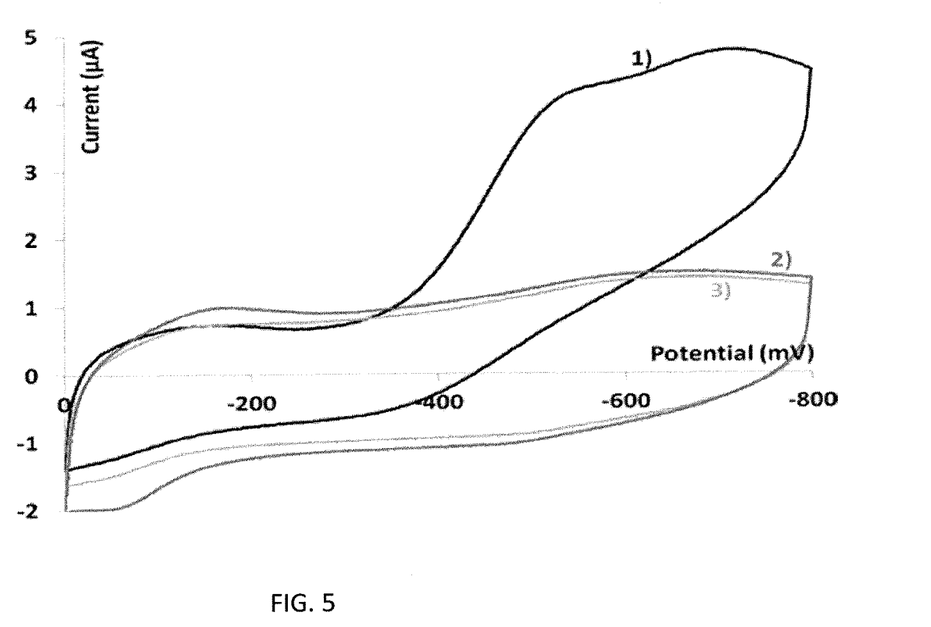
FIG. 5 provides cyclic voltammograms showing experimental results of the removal of dissolved oxygen from a sample stream, compared to removal of dissolved oxygen from the same sample using a known method.

FIG. 5 provides cyclic voltammograms based on analysis at detector 435 for 1) ambient dissolved oxygen values; 2) dissolved oxygen removal by the reference system of Pedrotti; and 3) dissolved oxygen removal by separator 5. It will be seen that curve 3 is virtually overlaid atop curve 2 indicating that separator 5 achieved near identical oxygen removal from the sample stream compared to the reference system.

Figure 6:
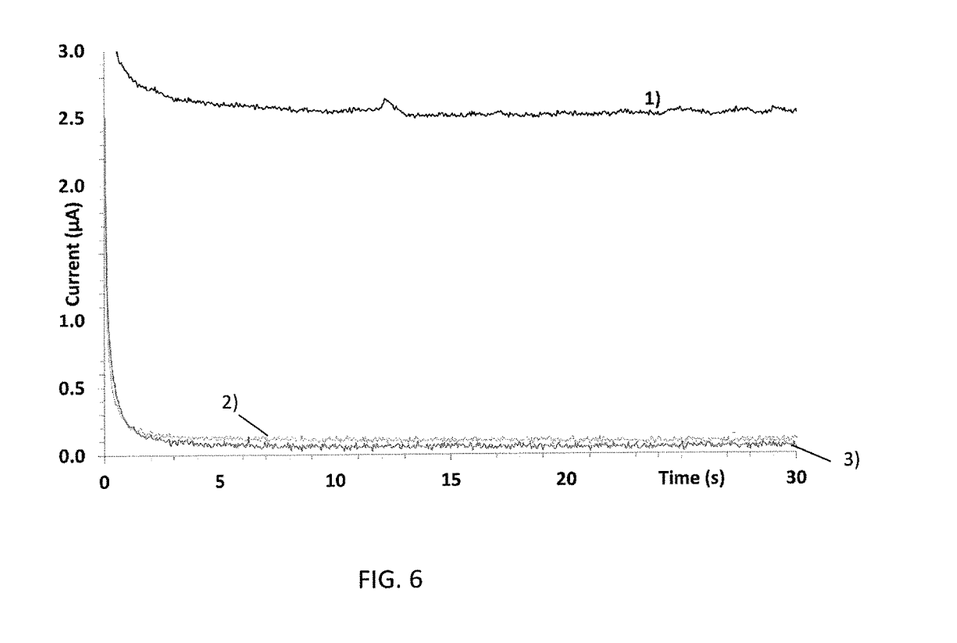
FIG. 6 provides amperograms showing experimental results of the removal of dissolved oxygen from a sample stream, compared to removal of dissolved oxygen from the same sample using the aforementioned known method.

Likewise, FIG. 6 shows amperograms for 1) ambient dissolved oxygen values; 2) dissolved oxygen removal by the reference system of Pedrotti; and 3) dissolved oxygen removal by separator 5. For all three, a very rapid increase in potential occurred by stepping from 0 to −800 mV, after which the curves for 2 and 3 decrease in sustained fashion to nearly 0, wherein curve 3 is virtually overlaid atop curve 2 indicating that separator 5 achieved near identical oxygen removal from the sample stream compared to the reference system.

It will be appreciated that separator 5 provides a low-power approach for removal of gases. For example, power consumption is readily evaluated based on the 1V potential applied in the example discussed above. For an 8 ppm oxygen sample stream at 10 µL/min, the maximum oxygen reduction current occurs immediately after the 1V potential is applied. Then the current steadily declines to a steady state value, making the energy needed for continuous dissolved oxygen removal less than 200 mW hr/L at steady state under the conditions mentioned. Such power consumption is fairly readily supplied by conventional battery or photovoltaic power sources, and is much lower than the power required to operate a vacuum pump.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of words such as "including," "comprising," "e.g.," "containing," "such as" or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A system for electrolytic removal of gas from a sample, comprising:
   a separator, which comprises:
      a sample chamber,
      a single gas receiving chamber configured to hold an electrolyte, and
      a membrane positioned between the sample chamber and the gas receiving chamber,
   wherein the membrane is permeable to at least one gas so that at least one gas passes through the membrane and moves from the sample chamber to the gas receiving chamber;
   the separator further comprising a positive electrode and a negative electrode positioned within the single gas receiving chamber and configured for electrical contact therebetween,
   wherein the positive and negative electrodes are positioned in the gas receiving chamber while the at least one gas moves between the electrodes, and
   wherein the first and second electrodes are configured so that when a sample with the at least one gas is present in the sample chamber, applying electric potential between said electrodes within the gas receiving chamber initiates electrolysis of the at least one gas.

2. The system of claim 1, further comprising an inlet for receiving a sample, the inlet being in fluid communication with the sample chamber.

3. The system of claim 2, further comprising an outlet in fluid communication with the sample chamber.

4. The system of claim 1, wherein the sample chamber includes a channel defining a flow path accommodating passage of the sample stream.

5. The system of claim 4, wherein the channel is in the form of a serpentine path.

6. The system of claim 1, further comprising a detector, wherein the detector comprises a detector inlet providing access to a sample stream flow path, a detector chamber for receiving an electrolyte, and at least two electrodes in contact with the sample stream flow path and arranged to sense the presence of the at least one gas in a sample moving within the sample stream flow path.

7. The system of claim 6, wherein the detector inlet is in fluid communication with an outlet of the separator in fluid communication with the sample chamber.

8. The system of claim 1, further comprising a second membrane between the electrodes, wherein the second membrane is permeable to the at least one gas.

9. A method of pre-treating a sample, comprising:
   configuring a sample chamber and a single gas receiving chamber relative to a membrane that is permeable to at least one gas and is positioned between the two chambers, wherein the single gas receiving chamber has a first electrode and a second electrode arranged for electrical contact therebetween;

positioning the first and second electrodes in the gas receiving chamber, wherein the electrodes are configured for the at least one gas to move between them;

introducing an electrolyte into the gas receiving chamber;

introducing a sample into the sample chamber; and applying electric potential between the electrodes so that as gas in the sample diffuses from the sample chamber to the gas receiving chamber, the gas is depleted at one of said electrodes.

10. The method of claim 9, further comprising testing the sample to determine the presence or absence of the at least one gas.

11. The method of claim 9, further comprising positioning a second membrane between the first and second electrodes, wherein the second membrane is permeable to the at least one gas.

\* \* \* \* \*